US011581006B2

(12) United States Patent
Hancock

(10) Patent No.: US 11,581,006 B2
(45) Date of Patent: *Feb. 14, 2023

(54) SYSTEMS AND METHODS FOR VARIABLY PACED REAL-TIME TRANSLATION BETWEEN THE WRITTEN AND SPOKEN FORMS OF A WORD

(71) Applicant: Tertl Studos, LLC, Montpelier, VT (US)

(72) Inventor: Christopher Hancock, Montpelier, VT (US)

(73) Assignee: Tertl Studos, LLC, Montpelier, VT (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/949,526

(22) Filed: Nov. 2, 2020

(65) Prior Publication Data

US 2021/0050031 A1 Feb. 18, 2021

Related U.S. Application Data

(63) Continuation-in-part of application No. 15/551,994, filed as application No. PCT/US2016/018807 on Feb. 19, 2016, now Pat. No. 10,825,357.

(Continued)

(51) Int. Cl.
*A63F 9/24* (2006.01)
*G10L 21/06* (2013.01)
(Continued)

(52) U.S. Cl.
CPC ............ *G10L 21/06* (2013.01); *G10L 15/187* (2013.01); *G10L 15/26* (2013.01);
(Continued)

(58) Field of Classification Search
CPC ................................ G09B 19/04; G09B 19/06
See application file for complete search history.

(56) References Cited

U.S. PATENT DOCUMENTS 5,333,275 A * 7/1994 Wheatley ................ G10L 15/18
704/231
2009/0004633 A1* 1/2009 Johnson ................. G09B 19/04
434/169

OTHER PUBLICATIONS

Singh, "First Examination Report", India App. No. 201717028179, dated Nov. 23, 2020.

* cited by examiner

*Primary Examiner* — David L Lewis
*Assistant Examiner* — Eric M Thomas
(74) *Attorney, Agent, or Firm* — STGIP, LLC; Shawn Gordon

(57) ABSTRACT

An enunciation system (ES) enables users to gain acquaintance, understanding, and mastery of the relationship between letters and sounds in the context of an alphabetic writing system. The ES enables the user to experience the action of sounding out a word, before their own phonics knowledge enables them to sound out the word independently; its continuous, unbroken speech output or input avoids the common confusions that ensue from analyzing words by breaking them up into discrete sounds; its user-controlled pacing allows the user to slow down enunciation at specific points of difficulty within the word; its real-time touch control allows the written word to be "played" like a musical instrument, with expressive and aesthetic possibilities; and its highlighting of the letter cluster that is responsible for the recognized phoneme enunciated by the user as it occurs allows the user to more easily associated the letters with the sounds.

20 Claims, 8 Drawing Sheets

Related U.S. Application Data

(60) Provisional application No. 62/118,172, filed on Feb. 19, 2015.

(51) Int. Cl.
*G10L 15/26* (2006.01)
*G10L 15/187* (2013.01)
G10L 15/02 (2006.01)
G10L 15/22 (2006.01)

(52) U.S. Cl.
CPC .. *G10L 2015/025* (2013.01); *G10L 2015/225* (2013.01); *G10L 2021/065* (2013.01)

SYSTEMS AND METHODS FOR VARIABLY PACED REAL-TIME TRANSLATION BETWEEN THE WRITTEN AND SPOKEN FORMS OF A WORD

RELATED APPLICATIONS

This application is a continuation-in-part of U.S. application Ser. No. 15/551,994, filed Aug. 18, 2017, which is a national stage application of PCT Application No. PCT/US 2016/018807, filed Feb. 19, 2016 and titled "Systems and Methods for Variably Paced Real-Time Translation between the Written and Spoken Forms of a Word," which claims priority to U.S. Provisional Patent Application No. 62/118, 172 filed Feb. 19, 2015, and titled "User Interface for the Correspondence between the Written and Spoken Forms of a Word", each of which is incorporated by reference in its entirety.

FIELD OF THE INVENTION

The present invention generally relates to speech synthesis, speech recognition, and real-time control and representation thereof. In particular, the present invention is directed to Systems and Methods for Variably Paced Real-Time Translation between the Written and Spoken Forms of a Word.

BACKGROUND

Part of learning to read is learning to sound words out—that is, to decode a written word by combining the speech sounds represented by the letters of a word. Many beginning readers have problems with a skill known as "blending"—that is, combining isolated speech sounds into a recognizable word. This problem can be interpreted as an artifact of a paradigm of phonics instruction that is overly reliant on teaching correspondences of isolated letters and isolated sounds.

SUMMARY OF THE DISCLOSURE

In a first exemplary aspect an enunciation system comprises: a database including a plurality of words, a pronunciation associated with corresponding respective one of the plurality of words, and a plurality of speed sounds corresponding to portions of the plurality of words; and a computing device in electronic communication with the database, the computing device including a visual display, a speaker, and a processor, the processor including a set of instructions for: providing a word from the plurality of words to a user; accepting an input from a user, wherein the input is a user selected portion of the word; and providing, concurrently with the input, an output, the output reflecting the correspondence between the speech sounds and letters of the user selected portion of the word.

In another exemplary aspect, a method of improving the decoding or enunciation of a written word by a user comprises: displaying a selected word to the user; providing a computing device for allowing the user to interact with the selected word; monitoring the user's interaction with a user selected portion of the selected word; determining a pronunciation output based upon said monitoring; and providing the output to the user through the computing device concurrent with the user's interaction, wherein the output reflects the correspondence between the speech sounds and letters of the user selected portion of the word.

In another embodiment, an enunciation feedback system includes a database having a plurality of words, wherein each of the plurality of words is associated with one or more phonemes corresponding to sequential portions of individual ones of the plurality of words and wherein each of the phonemes is associated with a letter cluster that includes one or more letters of the associated individual word. A computing device is in electronic communication with the database and includes a visual display, a microphone, and a processor. The processor including a set of instructions for providing a word from the plurality of words on the visual display, accepting a voice input via the microphone from a user without the use of an intraoral device, wherein the voice input includes a first sound, determining whether the first sound includes an enunciation of at least a portion of a first phoneme associated with the displayed word, and highlighting, if the first sound is determined to include an enunciation of at least a portion of the first phoneme, a first letter cluster of the displayed word concurrently with the voice input.

In addition, the first letter cluster may correspond to the first phoneme and is highlighted while the first sound continues.

In addition, the voice input includes a second sound, wherein the second sound follows in an unbroken progression the first sound, and wherein the set of instructions further includes instructions for determining whether the voice input has progressed to the second sound, determining whether the second sound includes an enunciation of at least a portion of a second phoneme of the displayed word, and highlighting, if the second sound is determined to include an enunciation of at least a portion of the second phoneme, a second letter cluster of the displayed word.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

An enunciation system (ES) and method according to the present disclosure enables users to gain acquaintance, understanding, and mastery of the relationship between letters and sounds in the context of an alphabetic writing system. An ES as disclosed herein enables the user to experience the action of sounding out a word, before their own phonics knowledge enables them to sound out the word independently; its continuous, unbroken speech output or input avoids the common confusions that ensue from analyzing words by breaking them up into discrete sounds; its user-controlled pacing allows the user to slow down enunciation at specific points of difficulty within the word; and its real-time touch control allows the written word to be "played" like a musical instrument, with expressive and aesthetic possibilities. While ES as discussed herein is described primarily in the context of educational applications, applications are possible in other areas. For example, an ES might serve as a musical or theatrical performance tool, enabling expressive speech and singing to be generated manually from text in real-time. Or an ES might serve as an adaptive tool for users with speech difficulties, enabling expressive control of synthesized speech that other systems do not provide. As will be discussed in more detail below, educational and expressive advantages of an ES are due to its explicit mapping between alphabetic symbols and speech sounds, enabling fine-grained user control with real-time feedback.

Figure 1:
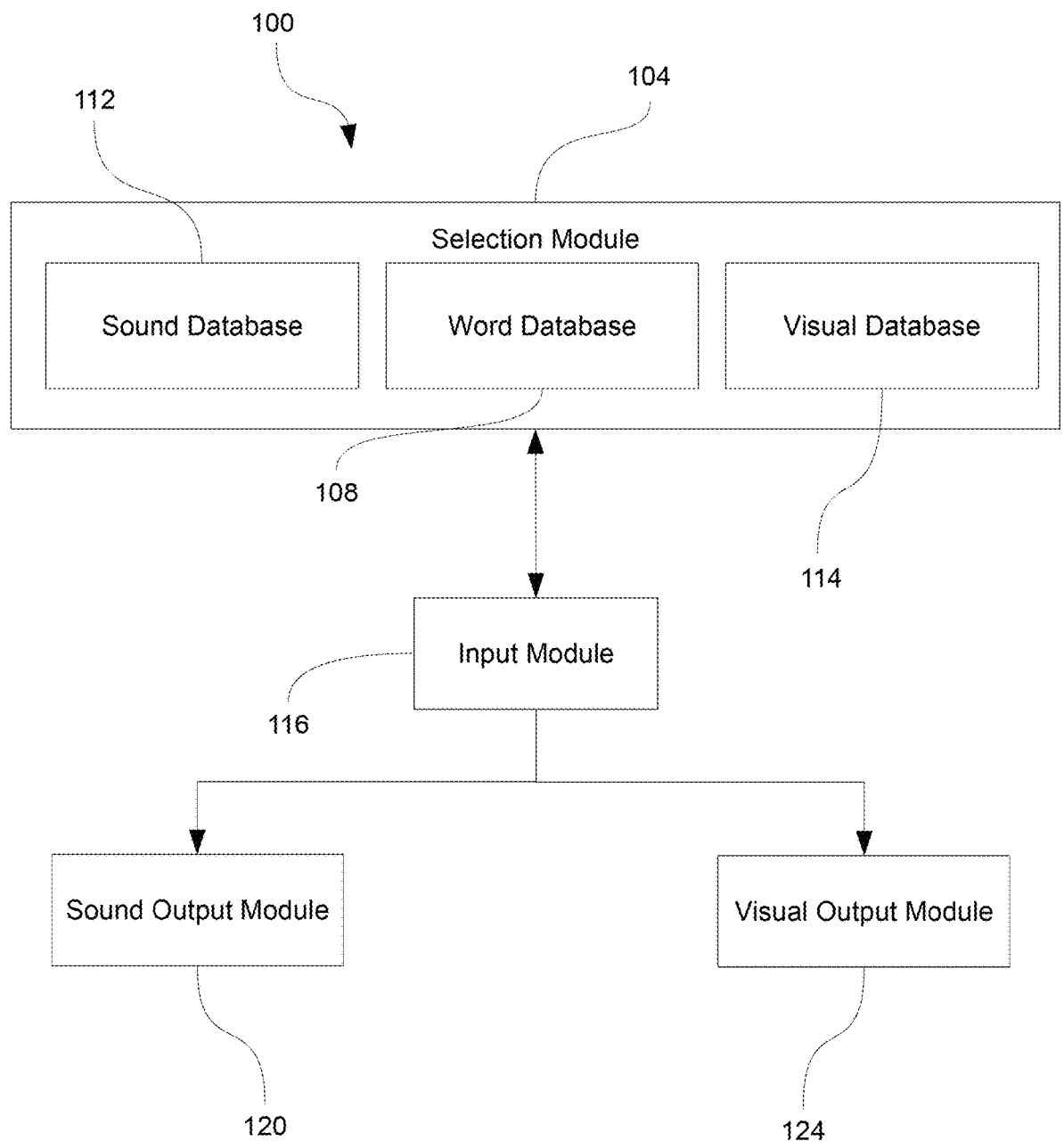
FIG. 1 is a block diagram of an exemplary enunciation system (ES) according to an embodiment of the present invention.

Turning now to a discussion of the Figures, and particularly to FIG. 1, there is shown a block diagram of an exemplary ES, ES 100, according to an embodiment of the present invention. In this exemplary embodiment, ES 100 includes a selection module 104 that has a word database 108, a sound database 112, and a visual database 114; an input module 116, a sound output module 120, and a visual output module 124.

Selection module 104 is designed and configured to store retrievable information related to portions of words, words, phrases, characters, sentences, or other written expressions (collectively referred to herein as "words") and sounds related to those words. As shown in FIG. 1, selection module 104 includes word database 108, sound database 112, and visual database 114. As would be understood in the art, the delineation of data into one or more databases is largely up to the discretion of the database architect, thus more or fewer databases of the aforementioned information may comprise selection module 104. In general, word database 108 includes a plurality of words (as defined above) and sound database 112 includes a corresponding pronunciations of each of those plurality of words. For example, word database 112 may include the word STARS, which can be dissected into the following portions: S, T, A, R, S, ST, TA, AR, RS, STA, TAR, ARS, STAR, and TARS. Accordingly, in this exemplary embodiment of selection module 104, sound database 112 includes sounds representative to each of those portions previously listed. In an alternative embodiment, sound database 112 may include an algorithmic function, such that not all portions of a given word need to be provided in the sound database; instead certain combinations of letters may be concatenated via the algorithm to provide the desired sound.

Visual database 114 can include visual representations or cues that correspond to the words being recited. In an exemplary embodiment, visual database 114 includes illustrations that correspond to the way a face moves when making certain sounds. Thus, a user can see, for example, the shape the face is in when it makes an "A" sound. In another exemplary embodiment, visual database 114 includes illustrations that correspond to how the internal muscles, organs, and tissues responsible for making the pertinent sound move during the process of making the sound. Exemplary muscles, organs, and tissues may include the tongue, lips, throat, lungs, etc. In use, and for example, as a user draws her finger over a word, she can look to this illustration to have a better understanding of how to produce the sounds associated with each portion of the word (e.g. each letter or cluster of letters) that her finger passes over.

At a high level, input module 116 allows a user to interact with selection database 104. For example, input module 116 can allow the user to select a word from word database 108 for enunciation assistance. Input module 116 can also allow the user to select portions of the selected word by, for example, running the user's finger across the word displayed on a touch screen. For example, and using the STARS example that is discussed above, the user could select, using input module 116, the "ST" portion, for pronunciation assistance. In an exemplary embodiment, input module 116 receives haptic input via a touch-screen. In alternative embodiments, input module 116 may be configured to receive other types of inputs from a user, such as, but not limited to, sounds, retinal movements (where ES includes sensors to recognize scanning by the user's eye over certain portions of the selected word or portion of the device), body movements (for example, when the ES is installed as an interactive billboard, a user can walk past, point toward, or otherwise indicate that certain portions of words should be pronounced, or other interactive input devices available with computing devices, e.g., trackballs, softkeys, cursor control devices, etc. Advantageously, input module 116 is responsive to the pace or progression of how the user interacts with the selected word in real time, thus giving the user a greater degree of control over the output.

In an exemplary embodiment of input module 116, the input module is capable of receiving sounds from the user that correspond to a selected word. As explained in more detail below, the sounds are then reflected into visual cues (with visual output module 124) to the user regarding the portion of the word being recited. Thus, a user of an exemplary ES, such as ES 100 can hear the word being pronounced and also practice her pronunciation of the word in real-time.

Input module 116 is in communication with sound output module 120 and visual output module 124. At a high level, sound output module 120 is capable of producing sounds related to the input received from the user. Thus, for example, as the user draws her finger across a selected word, sound output module 120 delivers the sounds associated with those letters, clusters of letters, or the selected word as a whole (if the user has progressed quickly enough across the word) identified by her finger. Thus, input module 116 and sound output module 120 work in tandem to provide real-time audio feedback with respect to the input provided by the user. For example, in an exemplary embodiment, as a user drags her finger across the word STARS and stops at the "A", sound output module 120 would produce the "STA" and hold the "A" for, preferably, as long as the user has her finger on the word "A".

Visual output module 124 is capable of producing visual cues that relate to the input received from the user. Thus, for example, as the user draws her finger across a selected word, visual output module 120 delivers a visual cue associated with those letters, clusters of letters, or the selected word as a whole (if the user has progressed quickly enough across the word) identified by her finger (this is more fully described below). Thus, input module 116 and visual output module 120 work in tandem to provide real-time visual feedback with respect to the input provided by the user. Turning again to the example presented above, as a user drags her finger across the word STARS and stops at the "A", visual output module 120 would show an image, such as, for example, an illustration of a face that mimics the way a face would move to make the portion of the word "STA" and the image would hold the face in the "A" shape for, preferably, as long as the user has her finger on the word "A". Visual output module 124 can be implemented, as previously referenced, as an illustration, or can show the inner workings of the mouth and associated body parts that contribute to the sound. In this way, visual output module 124 can assist the user with forming and creating the appropriate sounds so as to mimic the selected word; or it can assist the user in disambiguating speech output sounds that can be confused by the ear (a B versus a D, for example).

Figure 2A:
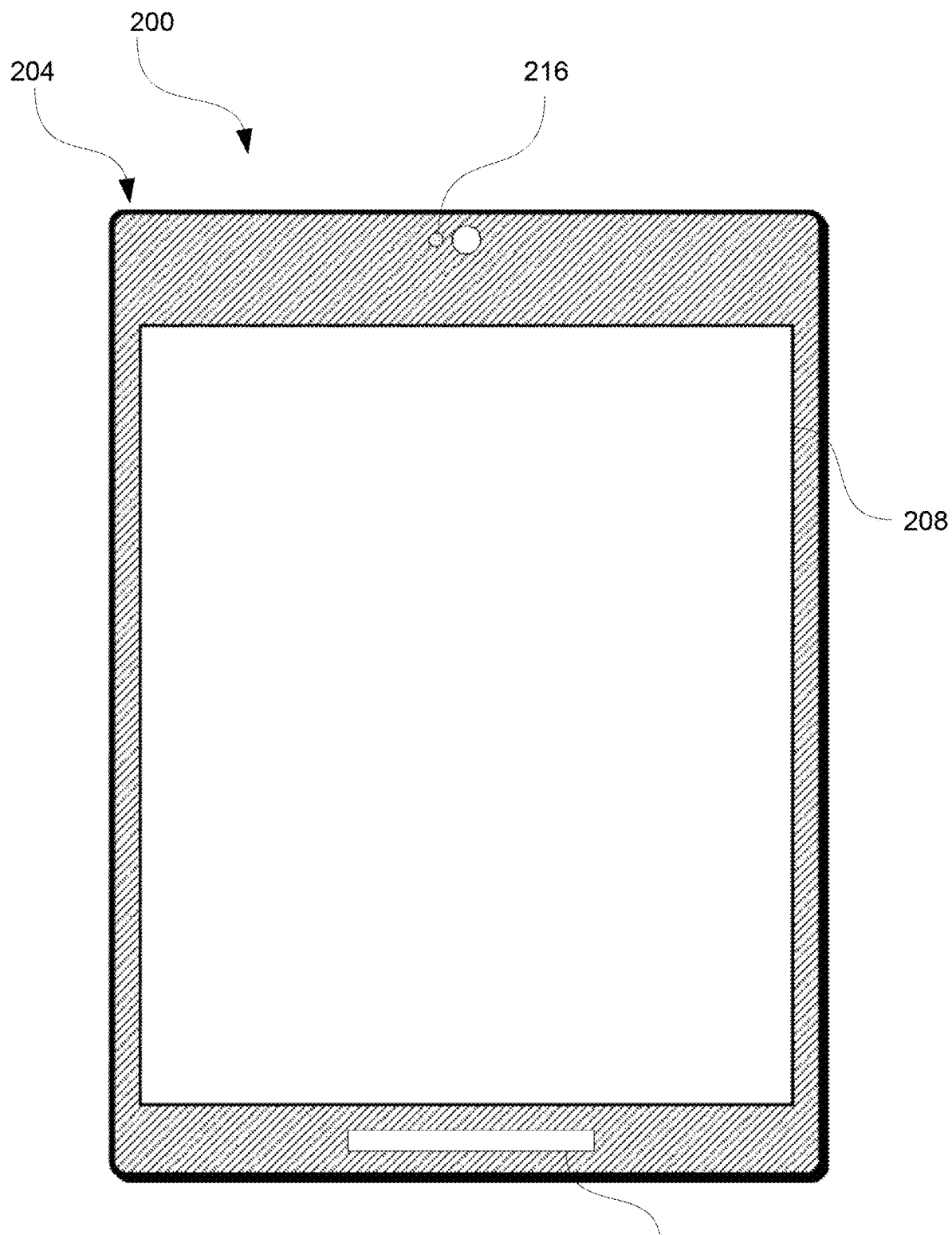
FIG. 2A is an illustration of an exemplary device suitable for use with an ES according to an embodiment of the present invention.

FIG. 2A shows an exemplary device, device 200, suitable for use with an ES, such as ES 100. Device 200 includes a computing device 204, a display 208, an audio device 212, and a microphone 216.

Computing device 204 is generally capable of interacting with an ES, such as ES 100, and allowing a user to interact with display 208, audio device 212, and microphone 216. As such, computing device 204 may take a variety of forms, including, but not limited to, a web appliance, a laptop computer, a desktop computer, a computer workstation, a terminal computer, web-enabled televisions, media players, smartphones, tablet computers, and electronic billboards. In an exemplary embodiment, computing device 204 includes a processor and a database. Processor includes a set of instructions for performing any one or more of the aspects and/or methodologies, such as processes 400 and 500, below, of the present disclosure. Database includes information and data such as, but not limited, word database 108, sound database, 112, and visual database 128.

Display 208 delivers visual information to a user of ES 100, and in certain embodiments, can be used to directly interact with the ES. For example, and with reference to FIGS. 2B-C, display 208 can be embodied as a touch-sensitive display. When embodied as a touch-sensitive display, display 208 is sometimes called a "touch screen" for convenience, and may also be known as or called a touch-sensitive display system. Display 208 can be used to display information or to provide interface objects 220 (e.g., virtual (also called "soft") control keys, such as buttons or keyboards), thereby providing an input interface and an output interface between device 200 and a user. Information displayed by display 208 can include graphics, maps, text, icons, video, and any combination thereof (collectively termed "graphics"). In an embodiment, and in use with ES 100, a user can select one or more interface objects 220, e.g., first object 220', using display 208 to select or alter the word (second object 220") being presented, or change the mode (third object 220''') being used by the user.

Figure 2B:
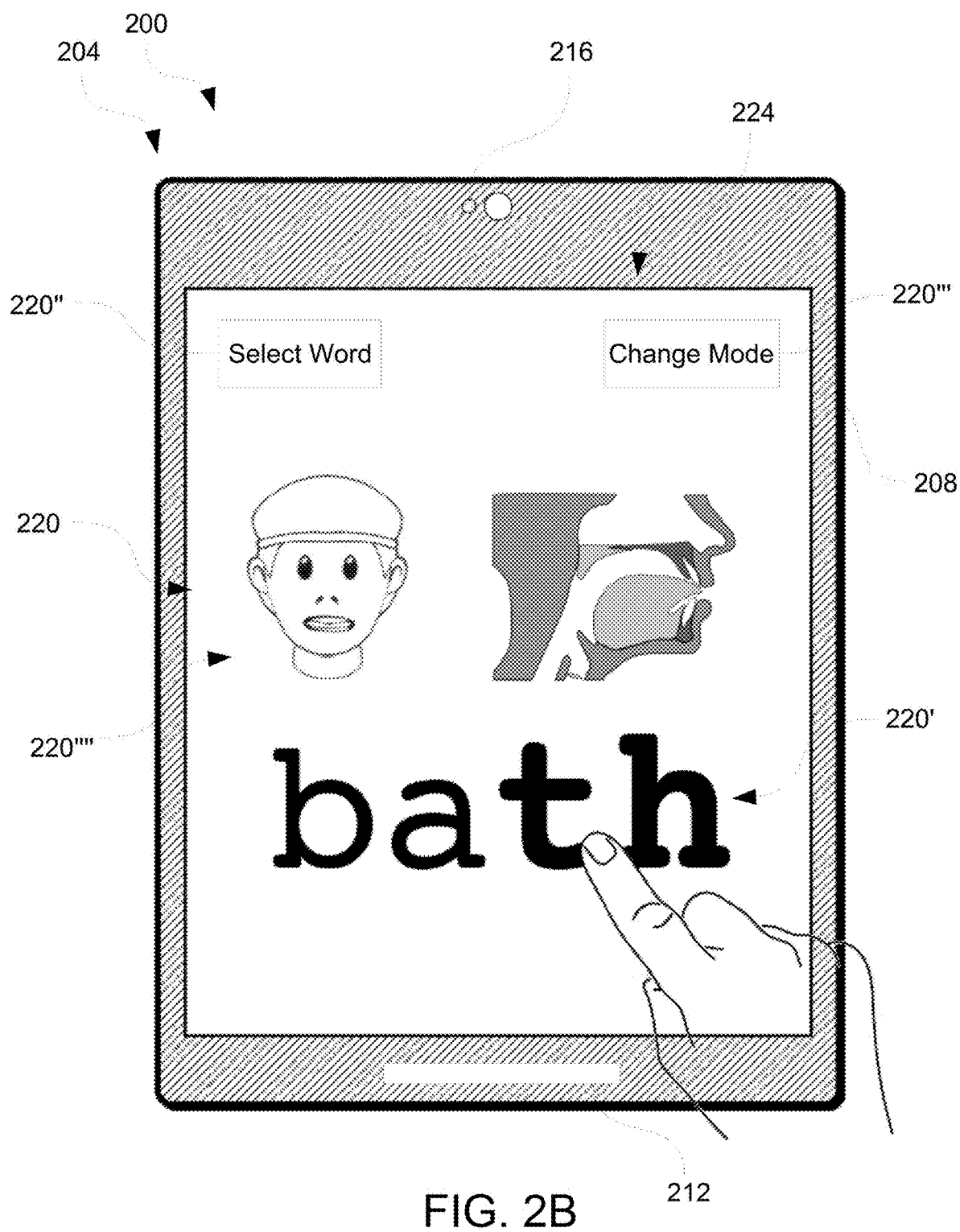
FIG. 2B is an exemplary user interface for an ES as shown on the exemplary device of FIG. 2A in which user tactile input determines the pace of audio output corresponding to the selected words or letters.

Collections of interface objects 220 comprise a user interface, such as sound output user interface 224 (FIG. 2B) and sound input user interface 228 (FIG. 2B). As shown in FIG. 2B, sound output user interface 224 includes a first object 220' that is a word that a user can learn to pronounce. First object 220' can change, for example, by shading or darkening, when the user touches display 208 proximate a portion of first object 220'. Second object 220" can be a "soft button" that allows the user to select a different word from a word database, such as database 108. Third object 220''' can change the mode of use (and thus, for example, the user interface) from a sound producing system to a sound receiving system. These two alternatives are discussed in more detail below with respect to processes 400 and 500. Additional possible interface objects include visual interface objects 220'''' that, as discussed above, present the user with visual cues as to the mechanics behind producing a given sound.

Sound input user interface 228 differs primarily from sound output user interface 224 in that the user does not have to make contact with first object 220'. Instead, as the user says the word, or any portion of the word, microphone 216 receives the sound and ES 100 determines what letter or cluster of letters have been recited by the user and then highlights (e.g., darkens, lightens, underlines, colors, points to, circles, displays with animated vibratory motion, etc.) those letters or clusters of letters to the user.

Figure 2C:
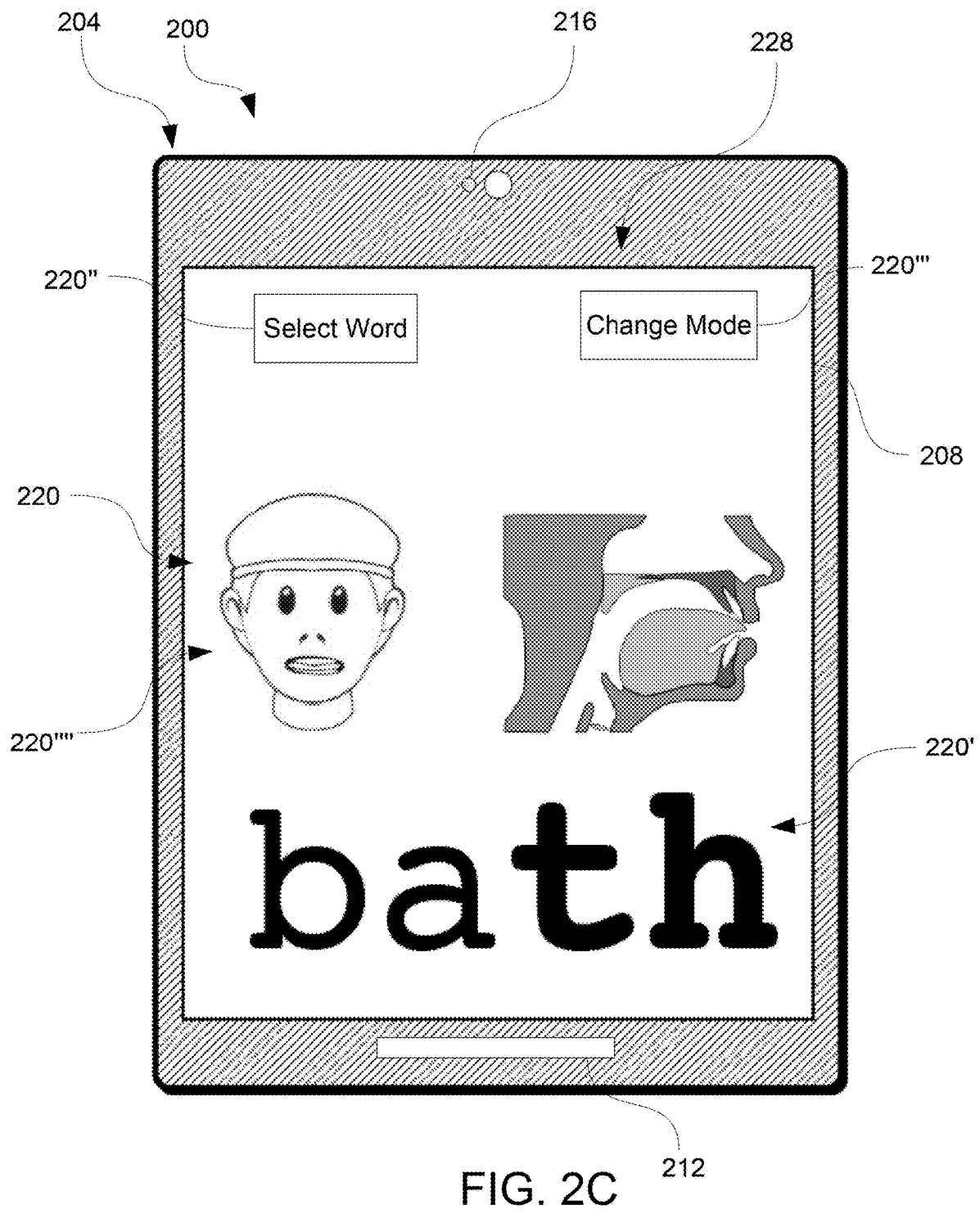
FIG. 2C is an exemplary user interface for an ES as shown on the exemplary device of FIG. 2A in which user voice input drives the highlighting of letters in the word.

In the embodiment shown in FIGS. 2A-C, display 208 has a touch-sensitive surface, which uses a sensor or set of sensors to accept input from the user based on haptic and/or tactile contact. Display 208 may use LCD (liquid crystal display) technology, or LPD (light emitting polymer display) technology, although other display technologies may be used in other embodiments. Display 208 can detect contact (and any movement or breaking of the contact) on the touch screen and converts the detected contact into interaction with interface objects (e.g., one or more soft keys, icons, web pages or images) that are displayed on the touch screen. Display 208 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a display 208. In an exemplary embodiment of the use of device 200, a user presses a finger to display 208 so as to initiate contact. In alternative embodiments, a user may make contact with display 208 using any suitable object, such as, but not limited to, a stylus.

Input device 208 facilitates navigation among and interacts with one or more interface objects 220 displayed in the display 208. In an embodiment, input device 208 is a click wheel that can be rotated or moved such that it can be used to select one or more user-interface objects 220 displayed on display 208. In an alternative embodiment, input device 208 can be a virtual click wheel, which may be either an opaque or semitransparent object that appears and disappears on the touch screen display in response to user interaction with device 200.

Device 200 can optionally include a transceiver (not shown) that receives and sends signals from the device. In an embodiment of device 200, transceiver sends and receives radio frequency signals through one or more communications networks and/or other computing devices. Transceiver may be combined with well-known circuitry for performing these functions, including, but not limited to, an antenna system, one or more amplifiers, a tuner, one or more oscillators, a digital signal processor, a CODEC chipset, a subscriber identity module (SIM) card, and a memory. As mentioned above, transceiver may communicate with one or more networks, such as the Internet, also referred to as the World Wide Web (WWW), an intranet and/or a wireless network, such as a cellular telephone network, a wireless local area network (LAN), and/or a metropolitan area network (MAN), and other devices. Device 200 may use any of a plurality of communications standards to communicate to networks or other devices with transceivers. Communications standards, protocols and technologies for communicating include, but are not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol. Transceiver may also be configured to assist device 200 in determining its current location.

Device 200 may also include other applications or programs such as, but not limited to, word processing applications, JAVA-enabled applications, encryption, digital rights management, voice recognition, voice replication, and a browser module. The browser module may be used to browse the Internet, including searching, linking to, receiving, and displaying web pages or portions thereof, as well as attachments and other files linked to web pages.

It should be appreciated that the device 200 is only one example of the mobile or non-mobile device that may be used with the present system and method, and that the device may have more or fewer components than mentioned, may combine two or more components, or a may have a different configuration or arrangement of the components. In the present system and method, device 200 may be implemented with any computing device that includes functionality suitable for viewing text and listening to sounds. Thus, device 200 is not restricted to a tablet or other hand-held device and may include a smartphone or other hand-held device, smart books, net books, laptops, desktop computers, and even larger computing devices.

Figure 3:
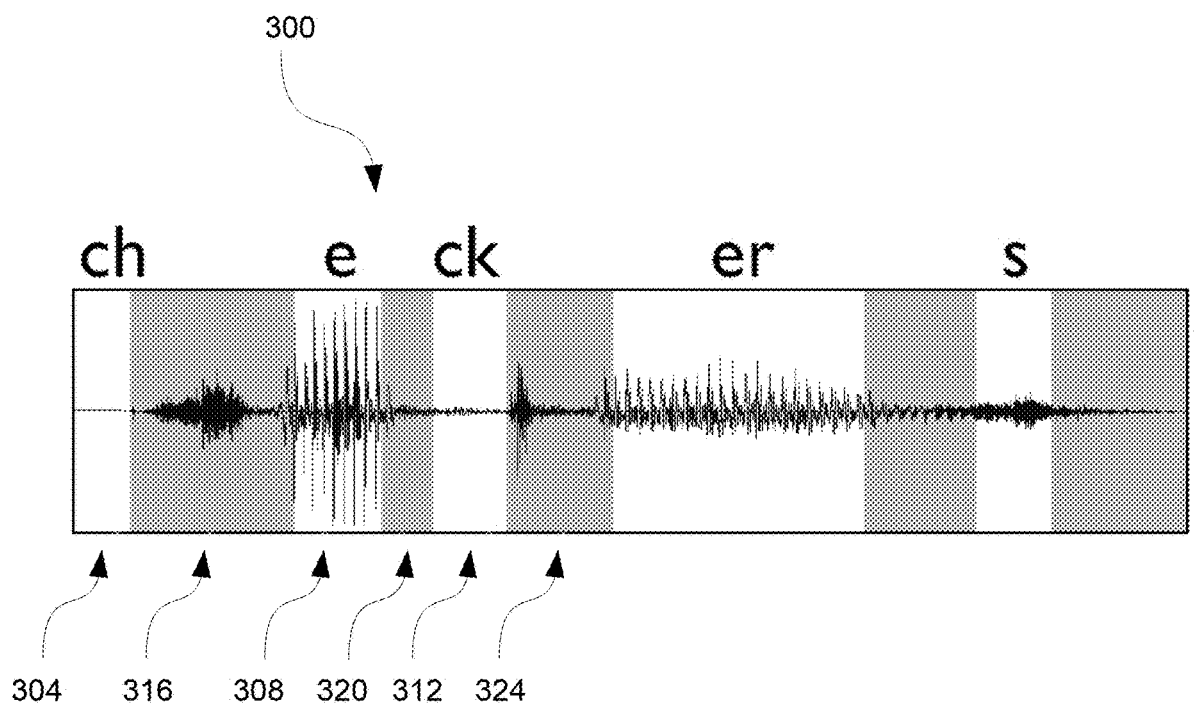
FIG. 3 is an exemplary audio graph showing the partitioning of a word, "checkers", according to an embodiment of the present invention.

Audio device 212 produces audible sounds. In an exemplary embodiment, audio device 212 produces audible sounds representative of what a user is touching when interacting with display 208, e.g., individual letters or clusters of letters. Although discussed in more detail below, FIG. 3 shows an exemplary audio graph 300 of the word "CHECKERS" that would be produced by audio device 212 when ES 100 is interacted with by a user.

Figure 4:
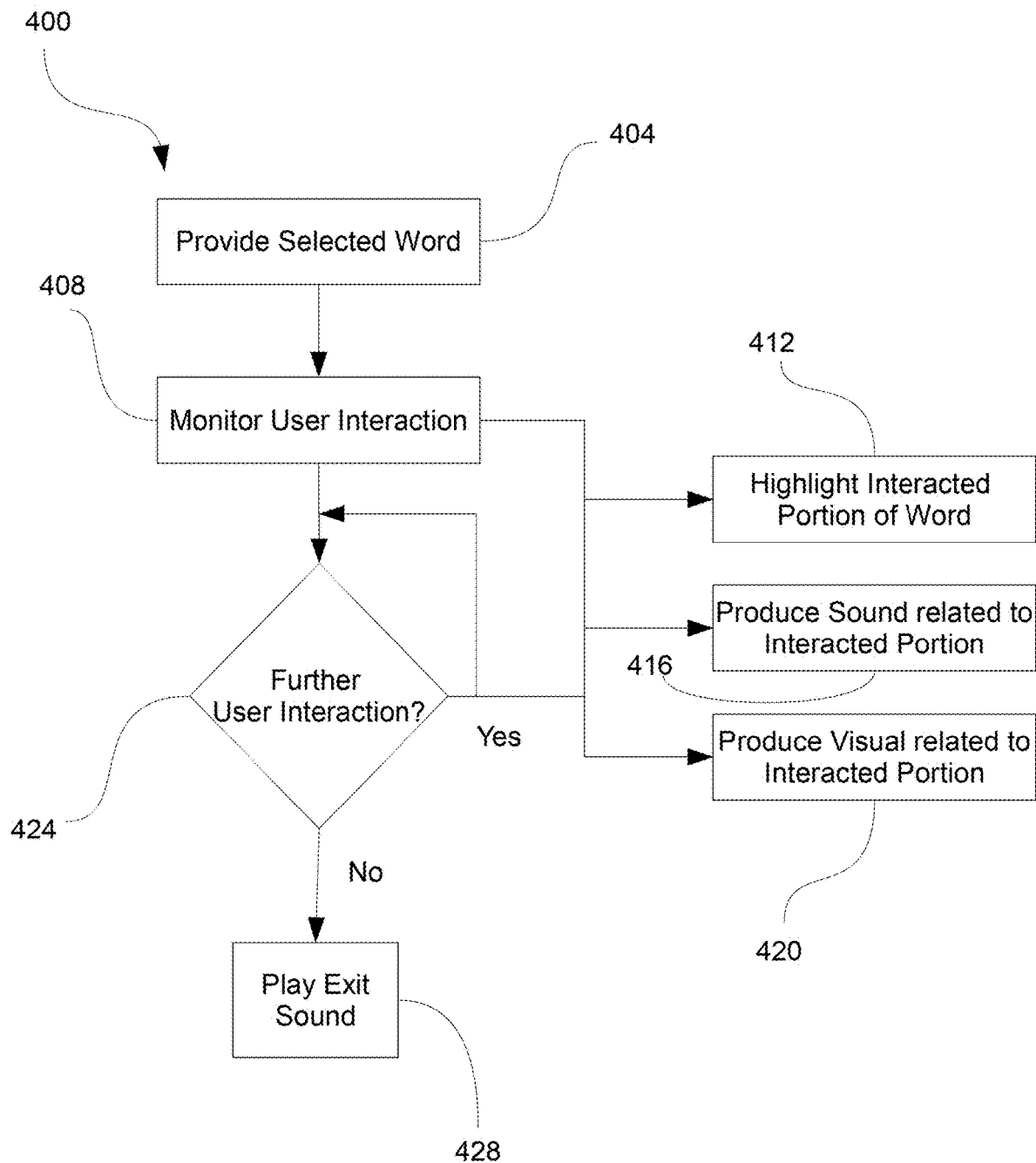
FIG. 4 is a block diagram of an exemplary method of providing correspondences between the written and spoken forms of a word according to an embodiment of the present invention.

Turning now to a discussion of FIG. 4, there is shown a method 400 of providing correspondences between the written and spoken forms of a word according to an exemplary embodiment. At a high level, and among other purposes, method 400 enables a user to discover the different speech sounds resulting from different letters or sequences of letters within a word (or within a portion of a word, a phrase, a sentence, or other utterance) and to hear how these speech sounds combine to make a complete spoken word or other utterance.

At step 404, a word to be enunciated is presented on a display, such as display 208 (FIG. 2A), in written form. As discussed previously, the term "word" can encompass portions of words, characters, sentences, phrases, and the like.

In an exemplary embodiment, at step 404 a word is displayed that has been selected by the user. In another exemplary embodiment, a word is chosen at random from a database of words, such as word database 108. In yet another embodiment, the word shown to the user is selected from among words that the user has not previously reviewed or worked with. In a further embodiment, the user can set parameters on the types of words to be displayed, for example, length, sound type, consonants used, vowels used, language, etc.

At step 408, the user interaction with one or more portions of the displayed word are monitored. In an exemplary embodiment, the user interacts by touching one or more letters associated with the word. In another embodiment, the user interacts by looking at one or more letters associated with the word on the display (in this embodiment, the device includes sensors that can identify eye movement and direction). In yet another embodiment, a user interacts by moving the user's entire body in front of the display (in this embodiment, the device may be an electronic billboard with sensors that detect motion and proximity to certain areas of the billboard).

At step 412, the interacted portion of the word, such as the touched letter, along with any other letters that may form "letter clusters"—that is, a contiguous group of letters responsible for production of a single phoneme or speech sound within the presented word, are highlighted (darkened, bolded, underlined, animated, etc.).

At step 416, concomitant with step 412, sound is produced corresponding to the interacted portion, typically beginning with any initial or entry sounds associated with the particular phoneme. For example, most vowel sounds in English are commenced with a glottal stop that causes the first part of the vowel sound to differ from what follows. Steps 412 and 416 may have any duration, from vanishingly short to arbitrarily long, at the discretion of the user. As the user continues to hold the position of her finger, typically the sound continues to be made and the portion of the word highlighted. The sound output generally consists of the continuant portion of the phoneme that is produced by the current letter cluster. For example, if the letter cluster is a single letter s, then the continuing output is a hissing sound. In this way, a user is afforded as much time as needed or desired to apprehend a specific sound within the spoken form of the word, along with the correspondence of the sound to a specific letter or letters in the written form of the word.

As mentioned above, an ES, such as ES 100, can also include a visual database 114. When implemented, method 400 can include options step 420, which, concomitant with step 412, displays a visual cue to the user corresponding the interacted portion. For example, and as described above, an illustration can show the shape of the mouth or the action of the muscles, organs, and tissues that make the sound. This information can assist the user in more fully understanding how to enunciate and/or pronounce the interacted portion, and in disambiguating speech sounds that may not be distinctly heard.

At step 424, is it determined whether the user has interacted with another portion in the word. The user can move her finger at any desired pace or progression and may move quickly or slowly across the current letter cluster.

If there is further interaction by the user, the newly interacted portion of the word is highlighted (at step 412), the sound concomitantly begins (at step 416), and the visual cue changes (at step 420). In an exemplary embodiment, sound transitions smoothly as the user's finger progresses, without a break, and plays any transitional speech sounds necessary to get from a continuable part of the previous phoneme to a continuable part of the new phoneme. For example, if the word is "YOU" and the user is advancing from the Y to the OU, then there is a transitional sound (that may be written as "yuh") that transitions from the Y's continuous "eee" sound to the OU's continuous "oo" sound. Step 424 can be repeated as desired by the user, during which time the user continues to receive real-time indications as to pronunciation and/or enunciations of the word.

At step 428, the user ends the recitation by either, for example, lifting her finger from the touch screen or moving her finger to a part of the screen where no letters are shown (for example, sliding off the end of a word). Regardless of the exit strategy employed by the user, the method produces an "exit" speech sound is provided that can transition the last phoneme to silence in a natural-sounding manner.

In certain embodiments of method 400, the user interacted with the word, causing the spoken form of the word to be enunciated (also referred to herein as speech sound). The timing of each speech sound within the enunciation is controlled by the user's interaction progress (e.g., speed of finger swipe). Pronunciation of a specific speech sound lasts for as long as the user interacts with the letter or letters responsible for that sound. As the user advances to a new letter or letter cluster, audio enunciation advances to the corresponding next sound. Simultaneously, coordinated views of an illustrated speaker's face and speech organs (as shown in FIGS. 2B-C) can show the configuration of the mouth, face, and speech organs during enunciation of the current speech sound.

The user has control of both the pacing of enunciation, and the portion of the word that is enunciated. By interacting relatively quickly across the whole word, the user can hear the whole word pronounced. By interacting relatively more slowly across the whole word, the user can hear the word pronounced more slowly. By pausing the interaction at any part of the written word, the user can prolong the enunciation of the corresponding part of the spoken word. The user can begin the interaction anywhere in the word, and stop interacting anywhere in the word; in this manner, any portion of the word can be enunciated. The extreme case of this is to press or tap on a single letter or letter cluster, in which case only the sound of that single letter or letter cluster is heard.

To enable one or more of the aspects of the present invention, speech synthesis and processing techniques are needed that enable production of speech sounds with varying duration. For example, the timing and pitch of pre-recorded speech sounds can be adjusted using a signal processing technique known as Pitch-Synchronous Overlap and Add (PSOLA). Other speech synthesis methods not reliant on pre-recorded voice samples can also be used, such as, but not limited to: methods based on vocal tract modeling, methods employing hidden Markov models, methods based on formant modeling; and other methods. In addition, hybrid methods employing combinations of the aforementioned speech methods, and other speech methods, may also be used. However, these techniques do not address the challenges of producing intelligible and appropriate-sounding articulation and intonation when speech sounds within a word are arbitrarily prolonged by real-time user input (e.g., a user holding a finger on a letter or cluster of letters).

One challenge in prolonging speech sounds is posed by explosive consonants such as b, p, t, d, g, k, and j. These sounds are identified by a sudden release that cannot be intelligibly prolonged over time. These sounds can be accommodated with a general framework that separates a word's speech sounds into continuant "central" sounds that can be prolonged or shortened under the user's direct control, and relatively brief sounds that make the transition from one phoneme to the next and are not directly controlled by the user. In certain embodiments disclosed herein, this problem is addressed by having the most salient sound of an explosive consonant being played as part of the transition to the next phoneme; the consonant's middle sound is silence. For example, a user pressing on the letter b will hear nothing until they leave the b, by swiping/dragging forward to the next letter or by releasing the letter. This is an instance where supplementary visuals are helpful, because the face can be shown with mouth in the "b" position, ready to release the explosive sound.

FIG. 3 shows how the speech sounds of the word "checkers" can be segmented to enable the interaction discussed just above using the audio graph 300. As shown, the wave form of the spoken word is divided into white "central" segments (e.g. 304, 308, 312) that can be prolonged by the user, and gray, "transitional" segments (e.g. 316, 320, 324) that cannot. The prolongable part of the initial "ch" letter cluster is silence (316); its characteristic explosive sound belongs to the following transitional segment (308), and is heard as the user progresses from "ch" to "e". As the user interacts with the "e", the user can hear the corresponding vowel sound 308 prolonged indefinitely. As the user's interacts with "ck", the transitional segment 320 will bring the "e" sound to a stop in a way that is subtly characteristic of the velar occlusion associated with "ck". The prolongable sound associated with "ck" is silence (312); the characteristic explosive sound of "ck" is finally head on the transition (324) from "ck" to the following "e".

Whenever the user begins or ends enunciation in the middle of the word, the transitions in or out of the middle of the word may be different. For example, if the user chooses to play only the first three letters of the word "CABLE," then the final "b" should end with an exhalation of breath ("buh") that is not present in the context of the full word. Also, enunciation of some words is customarily different at different speeds. For example, when said at full speed, the "tt" in "matter" is very brief, with almost no break in voicing; however, if a speaker pauses at "tt", then "tt" will produce a much stronger unvoiced explosion when the word is resumed. In a preferred embodiment, these are additional sounds that are part of a sound database, such as sound database 112.

Diphthongs also pose a problem for arbitrary prolongation by a user. In prolonging diphthongs it is generally desirable to maximize time during which an actual change in the vowel shape is audible, because this change strongly characterizes perception of the phoneme. For example, the "i" in like is, in many regions, commonly pronounced as a continuous glide from "ah" to "ee"; the essence of this speech sound is neither "ah" nor "ee" but the transition between them. (Moreover, seemingly "flat" vowels, such as the "a" in fan, can be heard on a closer listening to follow a diphthong—or triphthong—like contour in the pronunciation of many speakers). If the desired duration were known in advance, the glide could be paced to last as long as desired. However, in certain embodiments where the user controls durations in real-time, the software must begin to pronounce the glide without knowing how long the user will prolong the sound. Techniques for addressing this can include, but are not limited to:

simply prolonging the final portion of the diphthong (such as the final "ee" sound of the "i" in like); and/or pacing the glide increasingly slowly as long as the diphthong is activated, so as to approach asymptotically the point of transition to the diphthong's exit sound; and/or when the user moves on unexpectedly quickly, completing the glide as quickly as possible before proceeding to the exit sound; and/or anticipating likely diphthong duration based on interaction clues such as speed and location of pointer movement across the letters representing the diphthong; and/or in some cases, looping back to the beginning of the diphthong, which the user may understand as a sort of holding pattern while paused at this point in the word; and/or where intelligibility would otherwise be compromised, setting an upper limit on the duration of prolonged sounds, stopping the sounding out of a word when the limit is reached.

Intonation (reflected primarily in pitch and volume contours) adds additional temporal variables that can be adapted to the variable timing of enunciation. The techniques listed for diphthong enunciation can be equally applied to intonation as well. In addition, the range of pitch and volume variation can be enlarged over longer durations and, to prevent the perception of "over-articulation," reduced over shorter durations.

In certain embodiments, the user may be provided with control over intonation, allowing the user to control emotional, performative, or musical characteristics of the word in conjunction with the pacing of enunciation. Many intonation controls are possible, such as:

a menu of preconfigured intonations, from which the user makes a selection prior to sounding out;

intonation symbols—for example, a pitch graph—that can be edited by the user prior to sounding out the word;

real-time pitch and/or volume control based on the vertical position of the finger as it moves across the word;

real-time pitch and/or volume control via a distinct user interface element operated simultaneously with the sounding-out interface.

Figure 5:
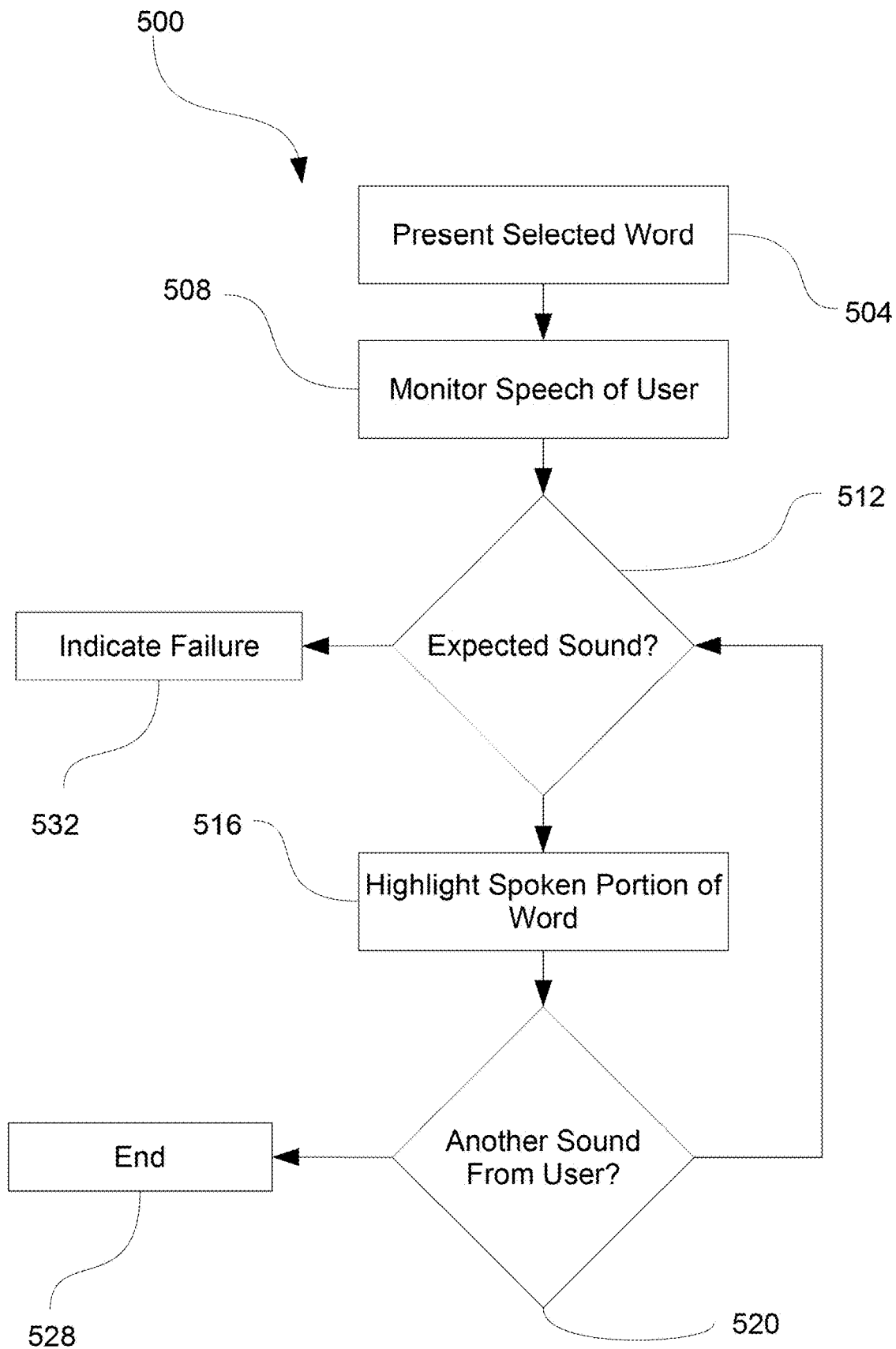
FIG. 5 is a block diagram of another exemplary method of providing correspondences between the written and spoken forms of a word according to an embodiment of the present invention.

Turning now to FIG. 5, there is shown a method 500 that assists a user with practicing the pronunciation, enunciation, or sounding-out of a written word. In contract to method 400 discussed above, method 500 allows a user to practice speaking the word or portions of the word with feedback from the ES, such as ES 100. In this mode of use, the written word display and visual displays remain functional. At a high level the user is presented a word; then the user enunciates it. Processing the user's spoken input can be conducted using speech recognition algorithms, and the letters in the written word corresponding to the user's current progress are highlighted through enunciation of the word. As before, the user has control of the pace of enunciation, this time through voice rather than touch. The user is free to prolong their enunciation of any part of the word.

At step 504, a word to be enunciated is presented on a display, such as display 208 (FIG. 2A), in written form. As discussed previously, the term "word" can encompass portions of words, characters, sentences, phrases, and the like. In an exemplary embodiment, at step 504 a word is displayed that has been selected by the user. In another exemplary embodiment, a word is chosen at random from a database of words, such as word database 108. In yet another embodiment, the word shown to the user is selected from among words that the user has not previously reviewed or worked with. In a further embodiment, the user can set parameters on the types of words to be displayed, for example, length, sound type, consonants used, vowels used, language, etc.

At step 508, the user begins speaking, typically commencing with the initial sound of a phoneme.

At step 512, a determination is made as to whether the initially spoken sounds are recognized as the beginning of a phoneme that occurs in the presented word. If the sound is not recognized, method 500 proceeds to step 532, otherwise the method proceeds to step 520.

At step 516, the letter cluster that is responsible for the recognized phoneme as it occurs in the presented word is highlighted (e.g., bold, underline, animation, etc.). For example, in FIG. 2C the letters "th" are bolded in the displayed word "bath" 220' when the voice input from user is recognized as a "th" sound. The user can continue to voice the current phoneme for as long as desired. In an alternative embodiment, highlighting can be shown instead on the letter cluster immediately following the letter cluster responsible for the recognized phoneme; this highlighting has the added function of guiding the learner to the next letters to be decoded. In another alternate embodiment, letter clusters for both the currently recognized phoneme and the immediately following phoneme might be highlighted, each in distinctive ways, to support the user's progress in enunciating the word. In a further alternate embodiment, highlighting may appear to be cumulative, so that, as the user progresses through the word or a portion thereof, visual effects are only added to, but not removed from, the letter cluster for each recognized phoneme. All of these constitute highlighting the currently recognized letter cluster in that they provide visible distinctions enabling the user to distinguish the part of the word they are currently enunciating, i.e., to assist the user to know "where they are" in the word.

At step 520, a determination is made as to whether the user's vocalization has progressed to a new phoneme. If another phoneme is detected, method 500 returns to step 512 to evaluate as to whether it is recognizable and whether the phoneme actually follows the previous phoneme in the presented word or not.

At step 520, a determination is made as to whether the user's vocalization has progressed to a new phoneme. If another phoneme is detected, method 500 returns to step 512 to evaluate as to whether it is recognizable and whether the phoneme actually follows the previous phoneme in the presented word or not.

If the user makes no further noise, at step 528 the method ends.

Step 532 is reached if the user at any point utters speech or sounds that do not match the presented word or the expected sound. In an exemplary embodiment, at step 532 highlighting of the word ceases and an error indicator (for example, an animation of a puff of smoke shown near where the last matching letter cluster, if any, was found) indicates that the interaction has failed.

The systems and methods described herein may be applied to any language spoken by humans, or to an invented language, and to any writing system that represents speech sounds—for example, Braille. The interface may be used for nonsense words, or for utterances longer or shorter than a single word, or be embedded in complex contexts, for example, literacy or language tutorial software, a game, a real or virtual musical instrument, or an e-book.

In another exemplary embodiment of an ES, such as ES 100, more detailed enunciation control, enabling artificial singing and other expressive uses, is provided using a pressure-sensitive touch device. Speech volume can vary in real-time as a function of the finger's pressure on the screen. Meanwhile speech pitch can be controlled by the finger's position on a vertical axis, even as the finger's horizontal position controls the progression from one phoneme to the next.

In yet another exemplary embodiment of an ES, such as ES 100, the sound output produces sounds not as a single voice, but as multiple voices overlaid, as though the word were being enunciated in unison by multiple speakers or singers.

In yet another exemplary embodiment of an ES, such as ES 100, the ES touch-driven display could be configured for creative and playful uses, based on using written words for vocal performance, and feature interactivity with other concurrent users (using for example the transceiver described herein). The display can present one or more words while also playing background music and rhythms, over which the user can layer vocalizations by moving his or her finger across the words, or parts of the words, in rhythmic or expressive ways. The display may show one or more singers or performers animated in synchronization with voice output. Pitch and volume may be controlled as well, as described above.

In yet another exemplary embodiment of an ES, such as ES 100, the speech driven form of the ES is embedded within a game, where the object of the game is to speak as many different sub-units of the word as possible. For example, if the word is "cat," allowable sub-units include utterances sounding like "k", "a", "t", "ka", "at", and "kat". Or, the system can present a word, and the player has a limited time to speak as many of these sub-units as he or she can think of. This game benefits phonics learning by engaging students in detailed analysis of the word into its component sounds.

In a further exemplary embodiment of an ES, such as ES 100, the ES touch-driven display could be included in a game that uses a mimicry challenge. After a word is presented, an onscreen character speaks a sound corresponding to a portion of the presented word. For example, if the presented word is "TROUBLE," the onscreen character might speak the sound "ub." The player is challenged to reproduce this sound. Criteria for matching might include not only the correct sequence of phonemes, but also matching of pacing. In a two-player version of this game, each player sees a different display of the same word or words (either on two separate devices, or simply at opposite ends of the same table device). Players take turns producing sounds that the opponent must then reproduce. In a further variation of the two-player game, the player who poses the challenge uses the voice-driven version of the ES to speak a legal sub-unit of the word, and the responding player uses the touch-driven version of the ES to replicate the spoken sub-unit.

In yet another exemplary embodiment of an ES, such as ES 100, the ES touch-driven display could be available within an e-book. In this embodiment, instead of presenting a single word, the entire text of the e-book can be enunciated using finger-based control. If the font is large enough, words, phrases, and sentences can be sounded out in place in the text. When the font is smaller, textual excerpts of interest can be selected and enlarged to enable touch-based sounding out.

In yet another exemplary embodiment of an ES, such as ES 100, is in the form of an interactive art installation. Letters forming one or more words are projected on a wall or screen. A user controls enunciation progress not using touch, but by bodily motions that are detected using sensors. For example, a school might install this embodiment in a hallway, with a word of the day projected on the wall, and enunciation paced by sensor-detected forward movement of people passing by, or by sensor-detected hand movement in a designated space along the wall. In an alternate mode, the same installation might accept speech input instead of motion or touch. This would provide an intellectually enriched school environment with ambient opportunities during the school day for playful interactions with reading and phonics.

In yet another exemplary embodiment of an ES, such as ES 100, a word can be assembled as a sequence of physical blocks that resemble alphabet blocks and are equipped with sensing and computational ability that enables detection of block adjacency, and of finger movement along the top of the blocks, and also enables wireless communication with a nearby computing device equipped with sound output. The blocks are also equipped with lighting output that enables a block's letter to be highlighted under software control. A player assembles a word by placing or attaching blocks side by side. Once assembled, the word can be "played" by sliding a finger along the top of the row of blocks. And, in an alternate mode, the assembled word can behave as a voice-driven ES, highlighting letter clusters in response to user voice input that is detected by the nearby computing device.

In yet another exemplary embodiment of an ES, voice input is accepted not from a live user but from pre-recorded or artificially generated speech, and translated by the ES, in real-time, into textual highlighting that is displayed concurrently with, and in synchrony with, the audio replay of the speech. For example, an e-book that provides pre-recorded narration might also highlight portions of words at the same time that those portions of words are being spoken in the narration.

Figure 6:
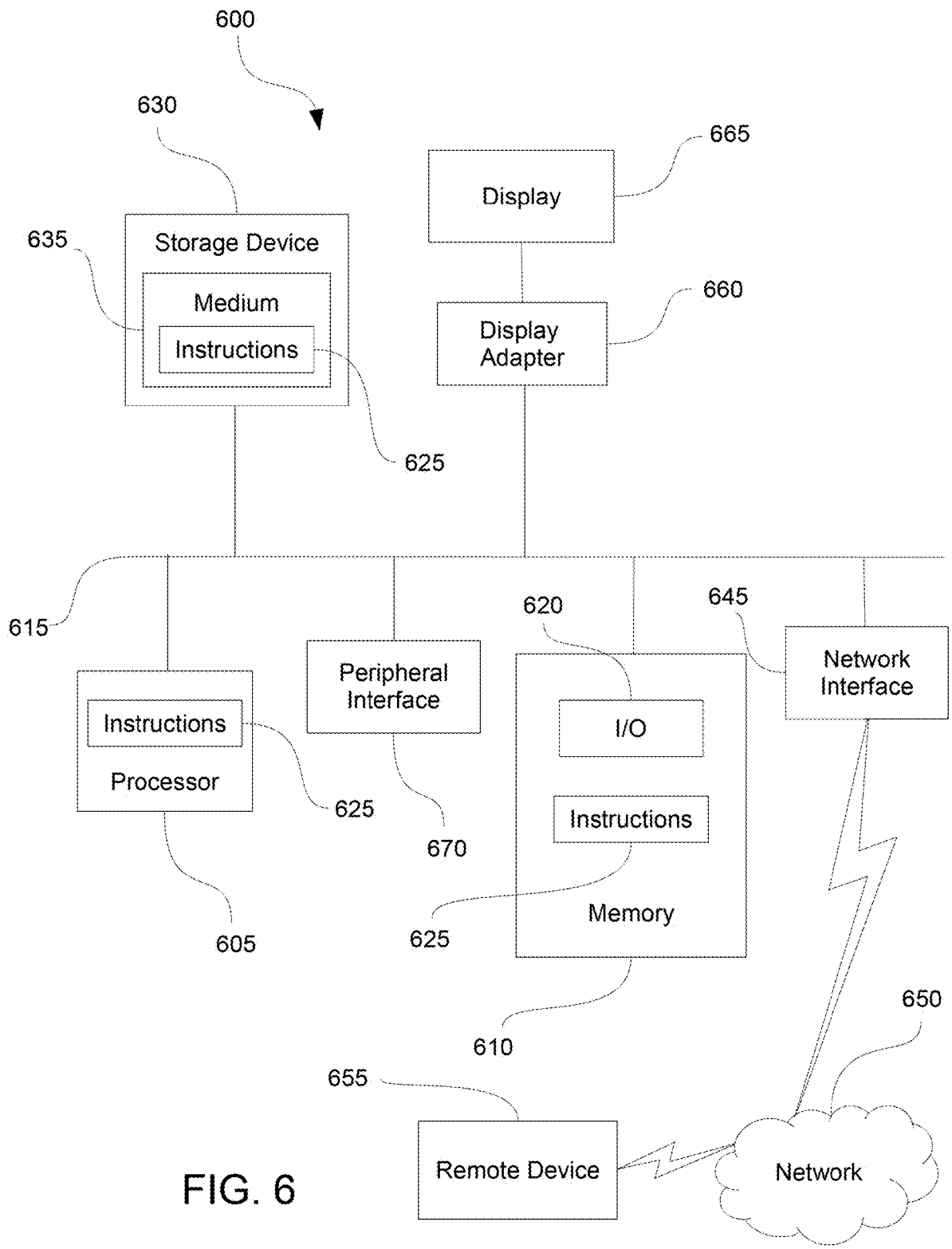
FIG. 6 is a schematic representation of a computer system suitable for use with the ES according to an embodiment of the present invention.

FIG. 6 shows a diagrammatic representation of one embodiment of computing system in the exemplary form of a system 600, e.g., computing device 204, within which a set of instructions that cause a processor 605 to perform any one or more of the aspects and/or methodologies, such as methods 400 and 500, of the present disclosure. It is also contemplated that multiple computing devices, such as computing device 204, or combinations of computing devices and mobile devices, may be utilized to implement a specially configured set of instructions for causing ES 100 to perform any one or more of the aspects and/or methodologies of the present disclosure.

Device 600 includes a processor 605 and a memory 610 that communicate with each other via a bus 615. Bus 615 may include any of several types of communication structures including, but not limited to, a memory bus, a memory controller, a peripheral bus, a local bus, and any combinations thereof, using any of a variety of architectures. Memory 610 may include various components (e.g., machine-readable media) including, but not limited to, a random access memory component (e.g, a static RAM "SRAM", a dynamic RAM "DRAM", etc.), a read-only component, and any combinations thereof. In one example, a basic input/output system 620 (BIOS), including basic routines that help to transfer information between elements within device 600, such as during start-up, may be stored in memory 610. Memory 610 may also include (e.g., stored on one or more machine-readable media) instructions (e.g., software) 625 embodying any one or more of the aspects and/or methodologies of the present disclosure. In another example, memory 610 may further include any number of program modules including, but not limited to, an operating system, one or more application programs, other program modules, program data, and any combinations thereof.

Device 600 may also include a storage device 630. Examples of a storage device (e.g., storage device 630) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 630 may be connected to bus 615 by an appropriate interface (not shown). Example interfaces include, but are not limited to, SCSI, advanced technology attachment (ATA), serial ATA, universal serial bus (USB), IEEE 6395 (FIREWIRE), and any combinations thereof. In one example, storage device 630 may be removably interfaced with device 600 (e.g., via an external port connector (not shown)). Particularly, storage device 630 and an associated non-transitory machine-readable medium 635 may provide nonvolatile and/or volatile storage of machine-readable instructions, data structures, program modules, and/or other data for device 600. In one example, instructions 625 may reside, completely or partially, within non-transitory machine-readable medium 635. In another example, instructions 625 may reside, completely or partially, within processor 605.

Device 600 may also include a connection to one or more systems or software modules included with ES 100. Any system or device may be interfaced to bus 615 via any of a variety of interfaces (not shown), including, but not limited to, a serial interface, a parallel interface, a game port, a USB interface, a FIREWIRE interface, a direct connection to bus 615, and any combinations thereof. Alternatively, in one example, a user of device 600 may enter commands and/or other information into device 600 via an input device (not shown). Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen (as discussed above), and any combinations thereof.

A user may also input commands and/or other information to device 600 via storage device 630 (e.g., a removable disk drive, a flash drive, etc.) and/or a network interface device 645. A network interface device, such as network interface device 645, may be utilized for connecting device 600 to one or more of a variety of networks, such as network 650, and one or more remote devices 655 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a direct connection between two computing devices, and any combinations thereof. A network, such as network 650, may employ a wired and/or a wireless mode of communication. In general, any network topology may be used. Information (e.g., data, instructions 625, etc.) may be communicated to and/or from device 600 via network interface device 655.

Device 600 may further include a video display adapter 660 for communicating a displayable image to a display device 665. Examples of a display device 665 include, but are not limited to, a liquid crystal display (LCD), a cathode ray tube (CRT), a plasma display, and any combinations thereof.

In addition to display device 665, device 600 may include a connection to one or more other peripheral output devices including, but not limited to, an audio speaker, a printer, and any combinations thereof. Peripheral output devices may be connected to bus 615 via a peripheral interface 670. Examples of a peripheral interface include, but are not limited to, a serial port, a USB connection, a FIREWIRE connection, a parallel connection, a wireless connection, and any combinations thereof.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An enunciation feedback system comprising:
   a database including a plurality of words, wherein each of the plurality of words is associated with one or more phonemes corresponding to sequential portions of individual ones of the plurality of words and wherein each of the phonemes is associated with a letter cluster that includes one or more letters of an associated individual word; and
   a computing device in electronic communication with the database, the computing device including a visual display, a microphone, and a processor, the processor including a set of instructions for:
   providing a word from the plurality of words on the visual display;
   accepting a voice input via the microphone from a user without the use of an intraoral device, wherein the voice input includes a first sound;
   determining whether the first sound includes an enunciation of at least a portion of a first phoneme associated with the displayed word; and
   highlighting, if the first sound is determined to include an enunciation of at least a portion of the first phoneme, a first letter cluster of the displayed word concurrently with the voice input.

2. The enunciation feedback system of claim 1, wherein the first letter cluster corresponds to the first phoneme and is highlighted while the first sound continues.

3. The enunciation feedback system of claim 1, wherein the voice input includes a second sound, wherein the second sound follows in an unbroken progression the first sound, and wherein the set of instructions further includes instructions for:
   determining whether the voice input has progressed to the second sound;
   determining whether the second sound includes an enunciation of at least a portion of a second phoneme of the displayed word, wherein the second phoneme sequentially follows the first phoneme in the word; and
   highlighting, if the second sound is determined to include an enunciation of at least a portion of the second phoneme, a second letter cluster of the displayed word.

4. The enunciation feedback system of claim 3, wherein the second letter cluster corresponds to the second phoneme and is highlighted while the second sound continues.

5. The enunciation feedback system of claim 3, further including indicating on the visual display a transition between the first letter cluster and the second letter cluster.

6. The enunciation feedback system of claim 1, wherein the highlighting includes displaying the first letter cluster in bold.

7. The enunciation feedback system of claim 1, wherein the highlighting includes displaying an animation near the first letter cluster.

8. The enunciation feedback system of claim 3, further including ceasing highlighting the first letter cluster when the second sound is detected.

9. The enunciation feedback system of claim 3, further including ceasing highlighting the first letter cluster when the voice input is no longer detected.

10. The enunciation feedback system of claim 1, wherein an error indicator is displayed if the first sound is not determined to include an enunciation of at least a portion of a phoneme associated with the displayed word.

11. The enunciation feedback system of claim 1, wherein the database includes at least one visual image associated with each of the phonemes.

12. The enunciation feedback system of claim 2, further including displaying an output, wherein the output includes a visual image associated with the first phoneme.

13. The enunciation feedback system of claim 12, wherein the output is an illustration of a mouth or speech organ, and wherein the illustration is capable of varying the mouth or speech organ configuration concomitant with the enunciation of at least a portion of the first phoneme.

14. The enunciation feedback system of claim 3, wherein the voice input includes a third sound, wherein the third sound follows the second sound, wherein the set of instructions further includes instructions for:
determining whether the third sound includes an enunciation of at least a portion of any phoneme associated with the displayed word; and
displaying, if the third sound is not determined to include an enunciation of at least a portion of any phoneme associated with the displayed word, an error indicator.

15. An enunciation feedback system comprising:
a database including a plurality of words and a plurality of speech sounds corresponding to sequential portions of individual ones of the plurality of words, wherein at least some of the plurality of speech sounds are denoted as prolongable; and
a computing device in electronic communication with the database, the computing device including a visual display, a microphone, and a processor, the processor including a set of instructions for:
displaying a word from the plurality of words on the visual display;
accepting a voice input from a user without the use of an intraoral device, wherein the voice input includes, in an unbroken progression, a first sound having a user-determined period of time and a second sound which immediately follows the first sound; and
displaying, concurrently with the voice input, an output, wherein the output includes, when the first sound is determined to correspond to a first one of the plurality of speech sounds corresponding to the word, highlighting a first subset of letters of the word corresponding to the first one of the plurality of speech sounds of the word for the user-determined period of time and includes, when the second sound is determined to correspond to a second one of the plurality of speech sounds of the word, highlighting a second subset of letters of the word corresponding to the second one of the plurality of speech sounds of the word.

16. The enunciation feedback system of claim 15, wherein the database includes at least one visual image associated with each of the plurality of speech sounds.

17. The enunciation feedback system of claim 16, wherein, when the first sound is determined to correspond to a first one of the plurality of speech sounds of the word, the output includes a visual image associated with the first one of the plurality of speech sounds of the word.

18. The enunciation feedback system of claim 17, wherein the output includes an animation of a mouth or speech organ that is varied concomitant with the first sound.

19. The enunciation feedback system of claim 15, further including displaying, when the voice input does not recognizably correspond to any of the plurality of speech sounds of the displayed word, an error indicator.

20. The enunciation feedback system of claim 15, further including displaying, when the second sound is not determined to correspond to either the first one of the plurality of speech sounds of the word or a one of the plurality of speech sounds that immediately follows the first one of the plurality of speech sounds of the word, an error indicator.

* * * * *